United States Patent
Cai

(10) Patent No.: US 8,254,541 B2
(45) Date of Patent: Aug. 28, 2012

(54) VALIDATING CALLER ID INFORMATION TO PROTECT AGAINST CALLER ID SPOOFING

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 1624 days.

(21) Appl. No.: 11/617,983

(22) Filed: Dec. 29, 2006

(65) Prior Publication Data

US 2008/0159501 A1    Jul. 3, 2008

(51) Int. Cl.
*H04M 1/56* (2006.01)
*H04L 12/66* (2006.01)

(52) U.S. Cl. .................. 379/142.05; 370/352

(58) Field of Classification Search .......... 379/88.21, 379/142.02, 142.06, 142.05; 370/260–271
See application file for complete search history.

(56) References Cited

U.S. PATENT DOCUMENTS

| | | | |
|---|---|---|---|
| 5,263,084 A | 11/1993 | Chaput et al. | |
| 5,265,145 A | 11/1993 | Lim | |
| 5,274,699 A | 12/1993 | Ranz | |
| 5,289,542 A | 2/1994 | Kessler | |
| 5,315,650 A | 5/1994 | Smith et al. | |
| 5,341,411 A | 8/1994 | Hashimoto | |
| 5,351,289 A | 9/1994 | Logsdon et al. | |
| 5,377,260 A | 12/1994 | Long | |
| 5,467,385 A | 11/1995 | Reuben et al. | |
| 5,949,873 A * | 9/1999 | Pinard | 379/234 |
| 5,953,399 A * | 9/1999 | Farris et al. | 379/207.15 |
| 6,324,271 B1 | 11/2001 | Sawyer et al. | |
| 6,496,569 B2 | 12/2002 | Pelletier et al. | |
| 6,650,743 B2 | 11/2003 | Heinmiller et al. | |
| 2002/0057764 A1* | 5/2002 | Salvucci et al. | 379/37 |
| 2003/0086539 A1 | 5/2003 | McCalmont et al. | |
| 2003/0105839 A1* | 6/2003 | Ben | 709/220 |
| 2006/0004896 A1* | 1/2006 | Nelson et al. | 707/206 |
| 2007/0036136 A1* | 2/2007 | Barclay et al. | 370/352 |
| 2007/0127658 A1* | 6/2007 | Gruchala et al. | 379/142.05 |
| 2007/0143422 A1* | 6/2007 | Cai | 709/206 |
| 2008/0086368 A1* | 4/2008 | Bauman et al. | 705/14 |
| 2009/0067410 A1* | 3/2009 | Sterman et al. | 370/352 |

FOREIGN PATENT DOCUMENTS

WO    WO 2007064686 A2    6/2007

* cited by examiner

*Primary Examiner* — Fan Tsang
*Assistant Examiner* — Solomon Bezuayehu
(74) *Attorney, Agent, or Firm* — Duft, Bornsen & Fishman, LLP

(57) ABSTRACT

Caller ID validation system and methods are provided. When a call is placed over a communication network, a validation system receives the call signaling, and processes the call signaling to identify originating node information in the call signaling. The originating node information is inserted by the communication network when handling the call and pertains to a network node that originates the call into the network. The validation system also processes the call signaling to identify caller ID information for the call. The validation system then processes the originating node information and the caller ID information to determine whether the call originated from the originating node. If the call did originate from the originating node, then the validation system determines that the caller ID information is valid.

16 Claims, 8 Drawing Sheets

VALIDATING CALLER ID INFORMATION TO PROTECT AGAINST CALLER ID SPOOFING

BACKGROUND OF THE INVENTION

1. Field of the Invention

The invention is related to the field of communications and, in particular, to systems and methods that validate caller ID information to protect a called party from caller ID spoofing.

2. Statement of the Problem

Service providers typically offer a caller ID service to their subscribers. A caller ID service is an intelligent network service that provides caller ID information, such as a calling party's directory number and name, to the called party's telephone equipment during the ringing signal. The communication network typically provides the caller ID information between the first and second rings of a call. The called party's telephone equipment then displays the caller ID information to the called party.

One problem with present caller ID services is that the caller ID information may not be valid, which is often referred to as caller ID spoofing. Caller ID spoofing is the practice of causing a communication network to display a directory number and/or name on the called party's telephone equipment which is not that of the actual originating station. For example, if a call is placed from the directory number NXX-XXX-0000, caller ID spoofing may be used so that the directory number NXX-XXX-9999 is displayed on the called party's telephone equipment. The motivation behind caller ID spoofing may be unlawful or mischievous, which exacerbates the problem and diminishes the value of the caller ID service.

There are presently companies that offer caller ID spoofing services for a fee. One such service uses a prepaid calling card. To use the caller ID spoofing service, a calling party dials a toll free number on the prepaid calling card and enters a PIN. The calling party then enters the directory number they want to call and the directory number they want displayed on the telephone equipment of the called party. The caller ID spoofing service then bridges the call and the called party's telephone equipment displays the false directory number as entered by the calling party. Other caller ID spoofing services use a web-based interface for spoofing VoIP calls. Because of the possibly harmful effects of caller ID spoofing, it is desirable to protect called parties against caller ID spoofing.

SUMMARY OF THE SOLUTION

The invention solves the above and other problems by providing validation systems and methods in a communication network that validate caller ID information for called parties. By validating the caller ID information, called parties can be more confident that the caller ID information being displayed by their telephone equipment is valid and is not spoofed. Also, a caller ID service offered by a service provider can be of more value as caller ID spoofing cannot have as much of a detrimental effect on the integrity of the caller ID information provided by the caller ID service.

In one embodiment of the invention, a validation system is implemented in a communication network. When a call is placed over the communication network, the validation system is adapted to receive call signaling for the call, and process the call signaling to identify originating node information in the call signaling. The originating node information is inserted by the communication network when handling the call and pertains to a network node that originates the call into the network. For instance, the originating node information may comprise a point code for an originating switch or a network access identifier for a wireless access point. The validation system also processes the call signaling to identify caller ID information for the call. The validation system then processes the originating node information and the caller ID information to determine whether the call originated from the originating node. If the call did originate from the originating node, then the validation system determines that the caller ID information is valid. If not, the validation system determines that the caller ID information is counterfeit.

As an example, assume that the originating node information comprises a point code for a switch originating the call in the communication network. Further assume that the caller ID information includes a point code related to the calling party directory number included in the caller ID information. The validation system may compare the point code for the originating switch and the point code associated with the calling party directory number to determine if the call originated from the originating switch.

In another embodiment, the validation system receives call signaling for a call. The validation system processes the call signaling to identify first network routing information inserted into the call signaling by the communication network. The first network routing information comprises any information used for routing in the communication network or any information derived from the information used for routing. The validation system then processes the call signaling to identify caller ID information for the call, and processes the caller ID information to identify second network routing information associated with the caller ID information. The second network routing information comprises any information included in or derived from the caller ID information that relates to network routing. The validation system then compares the first network routing information and the second network routing information to determine whether the caller ID information is valid.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-9 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
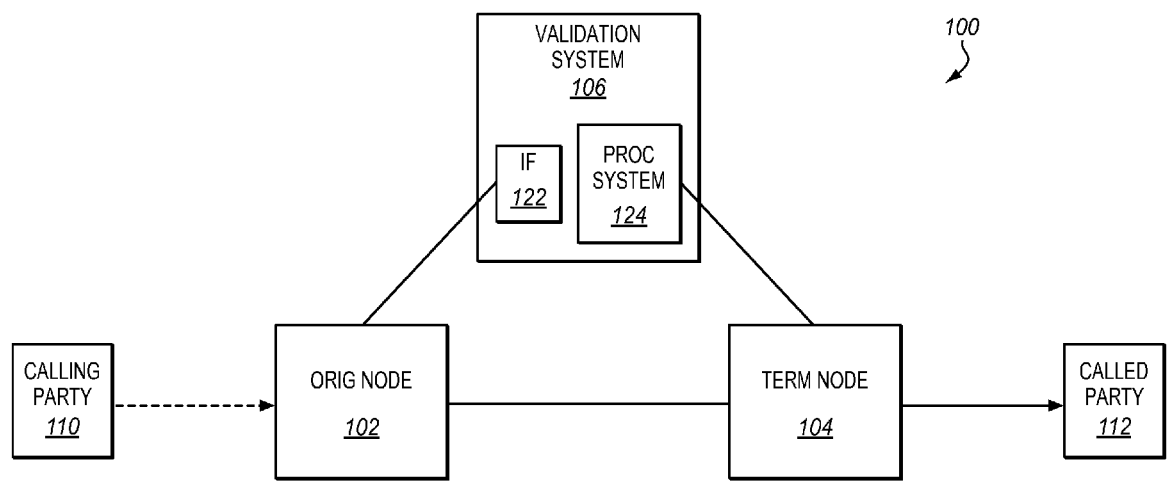
FIG. 1 illustrates a communication network in an exemplary embodiment of the invention.

FIG. 1 illustrates a communication network 100 in an exemplary embodiment of the invention. Communication network 100 is adapted to extend a call originated by a calling party 110 to a called party 112. Communication network 100 may comprise a circuit-based network, such as a PSTN or a wireless network, or may comprise a packet-based network, such as the Internet or an IMS network. Communication network 100 includes an originating node 102, a terminating node 104, and a validation system 106. Originating node 102 comprises any switch, router, or other network node that originates a call into communication network 100. As an example, originating node 102 may comprise a switch in a PSTN, may comprise an MSC in a wireless network, may comprise a VoIP switch, server, or router in a VoIP network, or may comprise a Proxy-Call Session Control Function (P-CSCF) in an IMS network. Originating node 102 may not be the first node to serve a call from calling party 110, as communication network 100 may not be the network that is serving calling party 110 (indicated by a dotted line between calling party 110 and originating node 102). As an example, communication network 100 may comprise a PSTN and calling party 110 may be a VoIP subscriber placing a call over a VoIP network (not shown). In such an example, the VoIP network would receive the call from calling party 110 and route the call to a gateway (not shown) connected to communication network 100. Originating node 102 would then receive the call from the gateway, which is in essence originating the call in communication network 100.

Terminating node 104 comprises any switch, router, or other network node that terminates a call to called party 112. As an example, terminating node 104 may comprise a switch in a PSTN, may comprise an MSC in a wireless network, may comprise a VoIP switch, server, or router in a VoIP network, or may comprise a Serving-CSCF in an IMS network. Although terminating node 104 is shown separate from originating node 102 in FIG. 1, those skilled in the art understand that originating node 102 and terminating node 104 may comprise the same network node.

Validation system 106 comprises any system, software, or application adapted to validate caller ID information in communication network 100. Validation system 106 may comprise an independent system or node in communication network 100 as shown in FIG. 1. Alternatively, validation system 106 may be implemented in originating node 102, terminating node 104, or another node of communication network 100 that is not shown in FIG. 1. As an example, validation system 106 may comprise plug-in software that is added to existing facilities of originating node 102 or termination node 104 and operates on an appropriate processing system.

In one embodiment, validation system 106 includes an interface 122 and a processing system 124. Interface 122 comprises any system or software adapted to receive call signaling for a call, such as from originating node 102 or terminating node 104. Processing system 124 comprises a single processing device or a group of inter-operational processing devices adapted to operate as described in FIG. 2. Some examples of processors are computers, integrated circuits, and logic circuitry. Processing system 124 may retrieve and execute instructions stored on storage media, such as memory devices, tape, disks, integrated circuits, and servers. Some examples of instructions are software, program code, and firmware.

To illustrate how caller ID validation is performed in communication network 100, assume that calling party 110 places a call to called party 112. Responsive to the call being placed, originating node 102 receives call signaling for the call and routes the call signaling to validation system 106.

Figure 2:
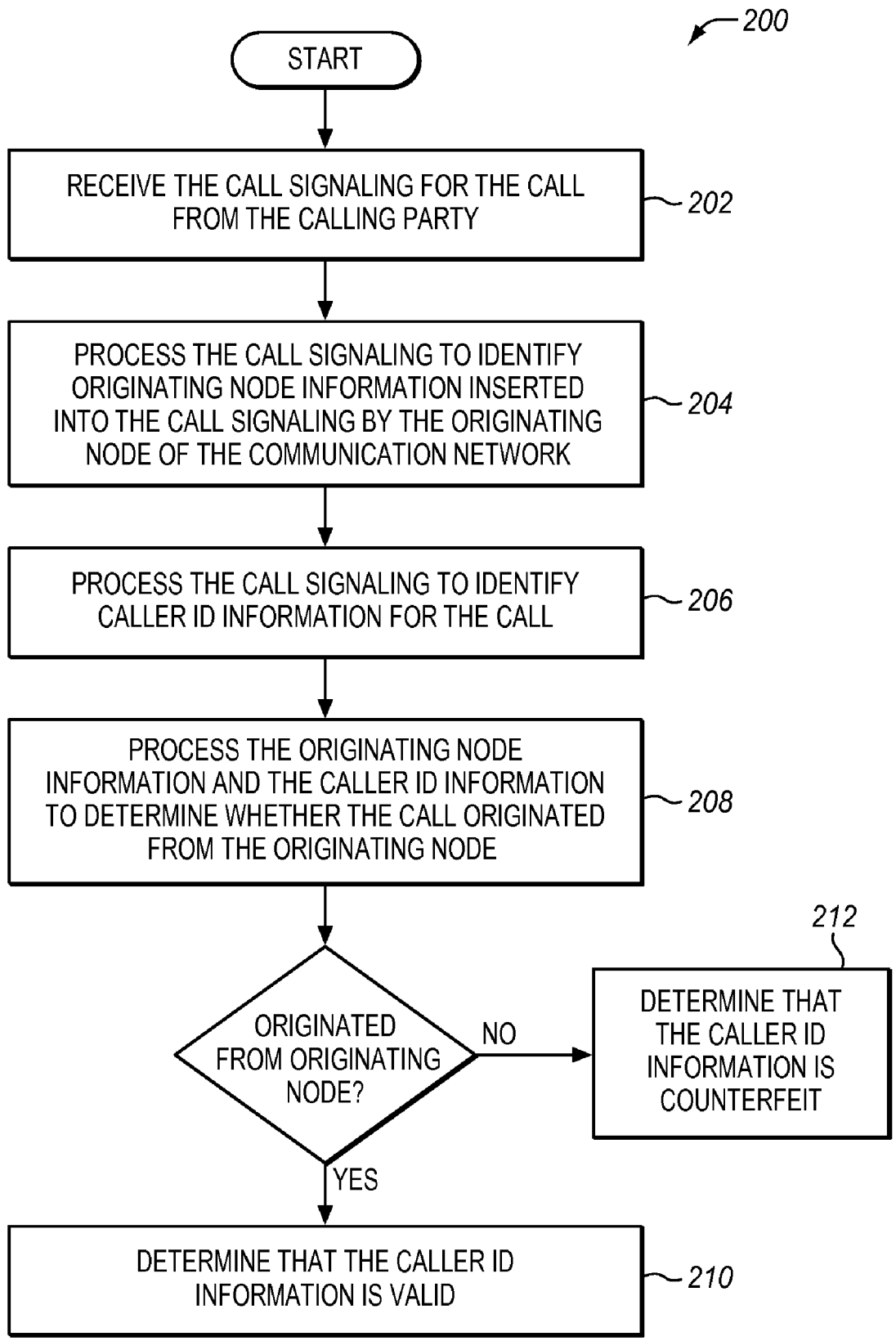
FIG. 2 is a flow chart illustrating a method of performing caller ID validation in a communication network in an exemplary embodiment of the invention.

FIG. 2 is a flow chart illustrating a method 200 of performing caller ID validation in communication network 100 in an exemplary embodiment of the invention. The steps of method 200 will be described with reference to communication network 100 in FIG. 1. The steps of the flow chart in FIG. 2 are not all inclusive and may include other steps not shown.

In step 202 of method 200, interface 122 receives the call signaling for the call from calling party 110. The type of call signaling depends on the nature of communication network 100. For instance, if communication network 100 is a PSTN, then the call signaling may be SS7 signaling. If communication network 100 is a VoIP network, such as an IMS network, then the call signaling may be SIP signaling. In any case, call signaling includes parameters that store caller ID information. The caller ID information may include a calling party directory number, a nature of address of the calling party directory number, a calling party directory name, a network domain, a network address, etc. The call signaling also includes parameters that store network routing information, such as point codes for routing in a circuit-based network or network addresses for routing in an IP network. This routing information is typically inserted in the call signaling by communication network 100.

In step 204, processing system 124 processes the call signaling to identify originating node information inserted into the call signaling by communication network 100. The originating node information represents some type of data or information relating to originating node 102 that is inserted in the call signaling by originating node 102 or by another node in communication network 100. For example, the originating node information may comprise a point code for a switch, an MSCID for an MSC, a network access identifier for an access point in a wireless network (e.g., a WiFi network), a network domain served by a VoIP switch, server, or router, or any other type of information.

In step 206, processing system 124 processes the call signaling to identify caller ID information for the call. In step 208, processing system 124 processes the originating node information and the caller ID information to determine whether the call originated from originating node 102 indicated by the originating node information. The determination by processing system 124 may be an estimation, as processing system 124 may process the originating node information and the caller ID information to determine whether it is likely that the call originating from originating node 102. There may be many desired methods of determining whether it is likely that the call originated from originating node 102, some of which are described below in FIGS. 3-6.

Figure 3:
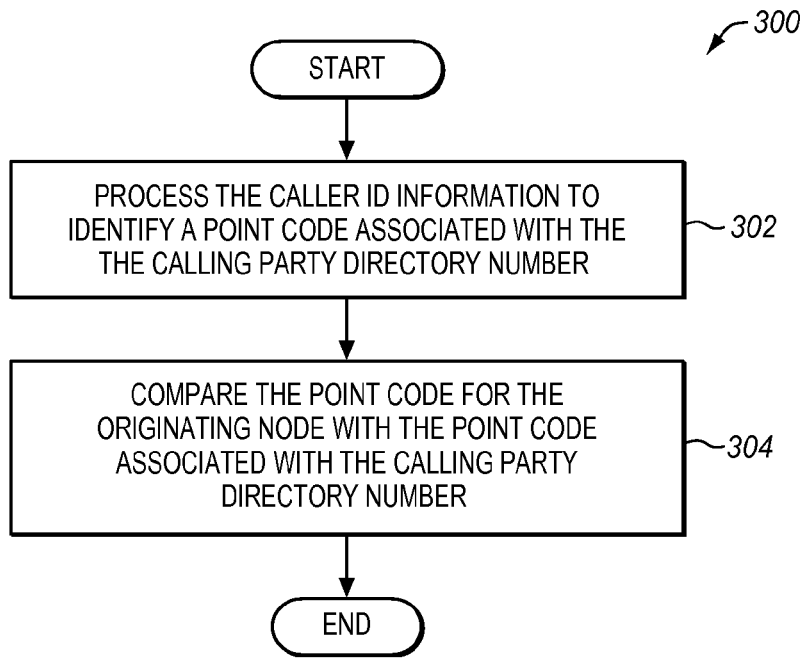
FIG. 3 is a flow chart illustrating a method of determining whether a call originated from an originating node in an exemplary embodiment of the invention.

FIG. 3 is a flow chart illustrating a method 300 of determining whether a call originated from an originating node in an exemplary embodiment of the invention. Assume that the originating node information in the call signaling comprises a point code for originating node 102 that was inserted into the call signaling by originating node 102. To determine whether it is likely that the call originated from originating node 102, processing system 124 processes the caller ID information to identify a point code associated with the caller ID information in step 302. For example, in an SS7 signaling network, the originating node, such as originating node 102, processes the calling party directory number included in the caller ID information to identify a point code associated with the calling party directory number. The originating node then inserts the point code associated with the calling party directory number into the call signaling as additional caller ID information. Processing system 124 may thus identify this point code in step 302 of method 300.

In step 304, processing system 124 compares the point code for originating node 102 and the point code associated with the caller ID information. If the point codes match, then processing system 124 may determine that the call originated from originating node 102. If not, then processing system 124 may determine that the call originated from another node.

Figure 4:
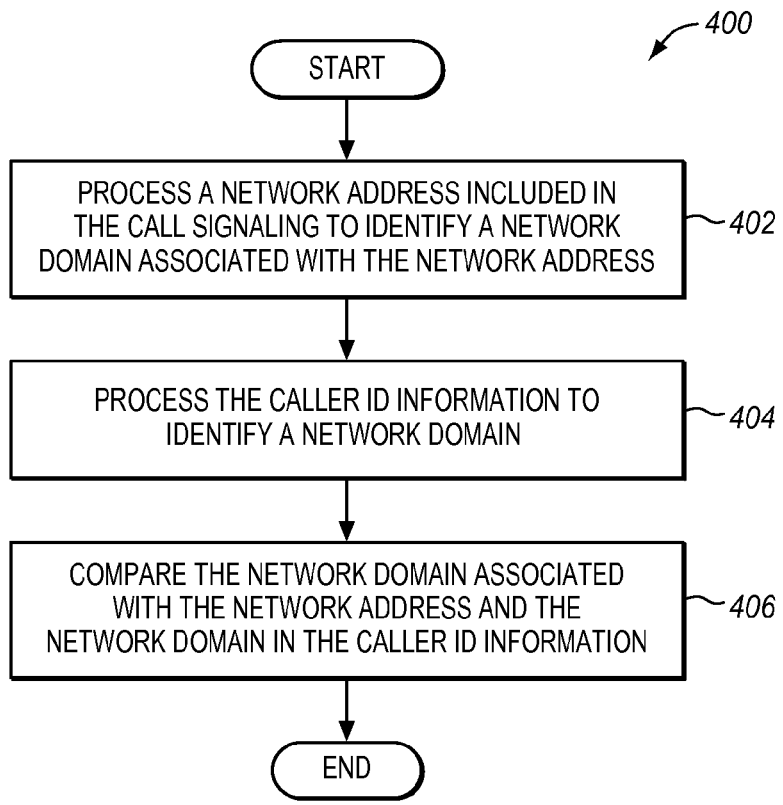
FIG. 4 is a flow chart illustrating another method of determining whether a call originated from an originating node in an exemplary embodiment of the invention.

FIG. 4 is a flow chart illustrating another method 400 of determining whether a call originated from an originating node in an exemplary embodiment of the invention. Assume that the originating node information in the call signaling comprises a network address in the call signaling. To determine whether it is likely that the call originated from originating node 102, processing system 124 processes the network address in step 402 to identify a network domain associated with the network address, such as by querying a Domain Name Server (DNS). In step 404, processing system 124 processes the caller ID information to identify a network domain in the caller ID information. For example, in a SIP signaling network, a network domain is typically included in the SIP messages. In step 406, processing system 124 compares the network domain associated with the network address and the network domain in the caller ID information. If the network domains match, then processing system 124 may determine that the call originated from originating node 102. If not, then processing system 124 may determine that the call originated from another node.

Figure 5:
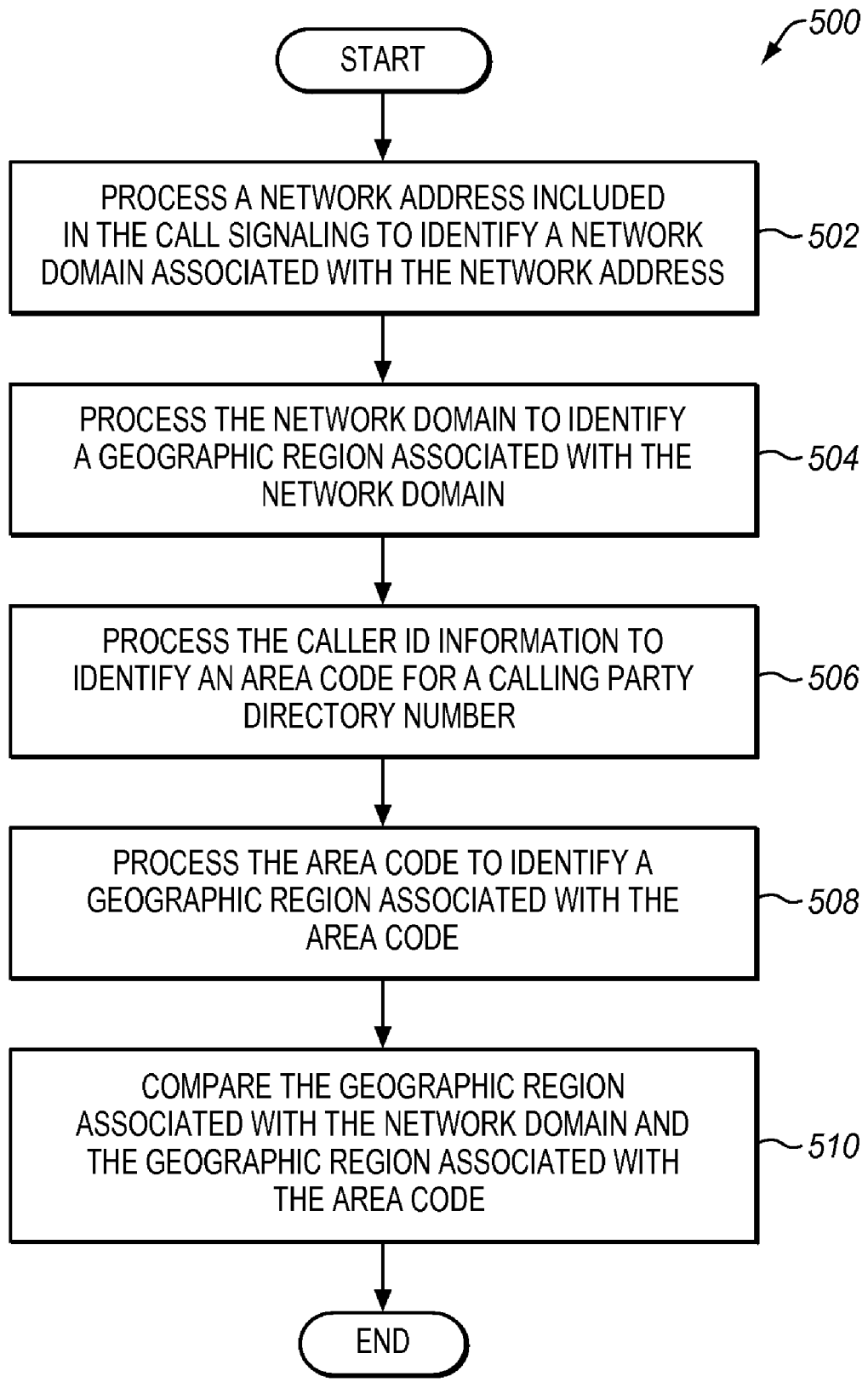
FIG. 5 is a flow chart illustrating another method of determining whether a call originated from an originating node in an exemplary embodiment of the invention.

FIG. 5 is a flow chart illustrating another method 500 of determining whether a call originated from an originating node in an exemplary embodiment of the invention. Assume that the originating node information in the call signaling again comprises a network address in the call signaling. To determine whether it is likely that the call originated from originating node 102, processing system 124 processes the network address in step 502 to identify a network domain associated with the network address, such as by querying a DNS. In step 504, processing system 124 processes the network domain to identify a geographic region associated with the network domain. For example, a particular network domain may be associated with a particular city and/or state.

In step 506, processing system 124 processes the caller ID information to identify an area code for a calling party directory number included in the caller ID information. In step 508, processing system 124 processes the area code to identify a geographic region associated with the area code. For instance, the area code 303 is associated with Denver, Colo. In step 510, processing system 124 compares the geographic region associated with the network domain and the geographic region associated with the area code. If the geographic regions match or are related, then processing system 124 may determine that the call originated from originating node 102. If not, then processing system 124 may determine that the call originated from another node.

Figure 6:
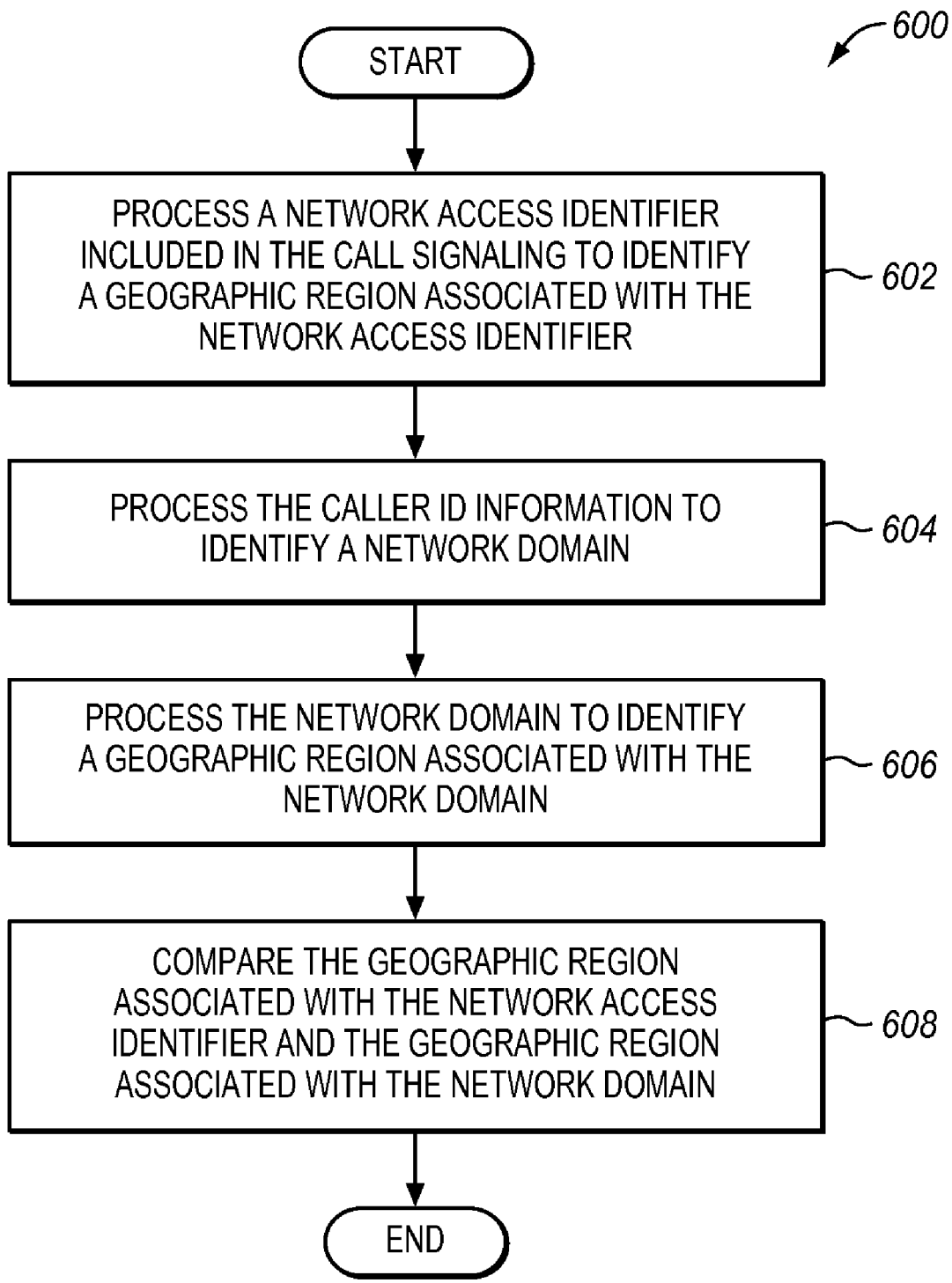
FIG. 6 is a flow chart illustrating another method of determining whether a call originated from an originating node in an exemplary embodiment of the invention.

FIG. 6 is a flow chart illustrating another method 600 of determining whether a call originated from an originating node in an exemplary embodiment of the invention. Assume that the originating node information in the call signaling comprises a network access identifier (e.g., a MAC address for an access point in a WiFi network) for originating node 102. To determine whether it is likely that the call originated from originating node 102, processing system 124 processes the network access identifier in step 602 to identify a geographic region (e.g., a latitude/longitude, a street address, a city and state, etc) associated with the network access identifier, such as by querying a database that maps network access identifiers with geographic regions. In step 604, processing system 124 processes the caller ID information to identify a network domain in the caller ID information. In step 606, processing system 124 processes the network domain to identify a geographic region associated with the network domain, such as by querying a DNS with the network address in the call signaling. In step 608, processing system 124 compares the geographic region associated with the network access identifier and the geographic region associated with the network domain. If the geographic regions match or are related, then processing system 124 may determine that the call originated from originating node 102. If not, then processing system 124 may determine that the call originated from another node.

If a determination is made in step 208 of FIG. 2 that the call originated in originating node 102, then processing system 124 determines that the caller ID information is valid in step 210. If the caller ID information is valid, then communication network 100 may transmit the caller ID information to called party 112 through terminating node 104.

If a determination is made in step 208 that the call did not originate in originating node 102, then processing system 124 determines that the caller ID information is counterfeit in step 212. If a determination is made that the caller ID information is counterfeit, then communication network 100 may perform different functions. In one embodiment, communication network 100 may release the call. In another embodiment, communication network 100 may transmit the caller ID information and a warning message to called party 112 indicating that the caller ID information may be counterfeit. In another embodiment, communication network 100 may transmit a notification to a third party, such as the service provider, law enforcement entities, etc. The notification reports that counterfeit caller ID information may have been identified, and may also include information on calling party 110 who placed the call having the counterfeit caller ID information. In another embodiment, communication network 100 may determine valid caller ID information for the call, and transmit the valid caller ID information to called party 112.

The methods described above advantageously validate caller ID information for a called party. The methods use information that is inserted in the call signaling by communication network 100, such as the originating node information, to validate the caller ID information. Because the originating node information is inserted in the call signaling by communication network 100, this data cannot be tampered with by a calling party or a caller ID spoofing service. The methods thus compare this network-entered information with the caller ID information, which can more easily be tampered with, to validate the caller ID information.

Communication network 100 may validate the caller ID information for every call. For instance, responsive to receiving a call signaling in either originating node 102 or terminating node 104, either of these nodes may automatically forward the call signaling to validation system 106 for validation. In an alternative embodiment, communication network 100 may validate the caller ID information responsive to a request from called party 112. For instance, assume that communication network 100 forwards caller ID information to called party 112 for a call, and called party 112 is suspicious of the validity of the caller ID information. Called party 112 may then request that communication network 100 validate the caller ID information, such as by entering a feature code (e.g., *88). Responsive to the request, the call signaling is routed to validation system 106 to perform validation of the caller ID information.

Figure 7:
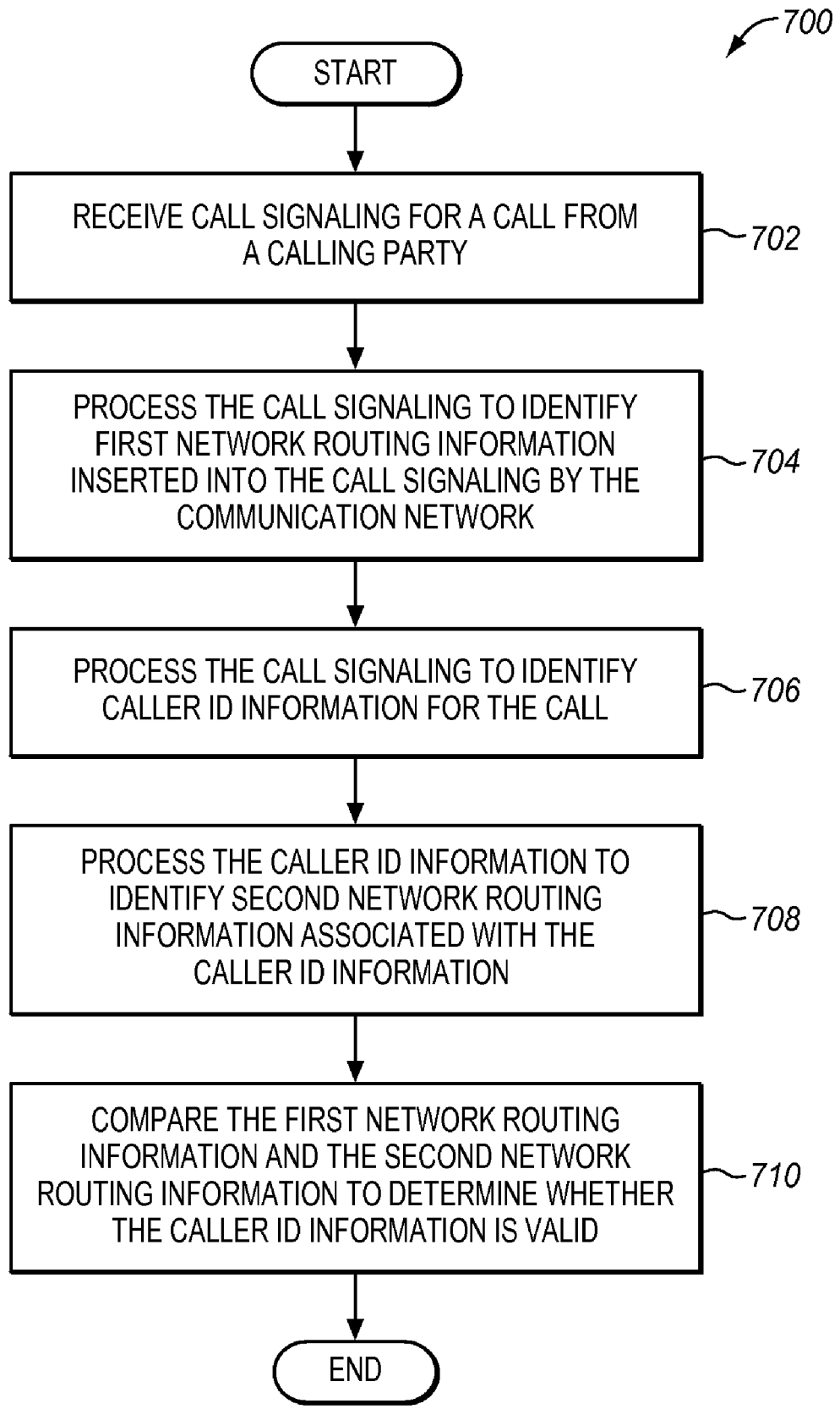
FIG. 7 is a flow chart illustrating another method of performing caller ID validation in a communication network in an exemplary embodiment of the invention.

FIG. 7 is a flow chart illustrating another method 700 of performing caller ID validation in communication network 100 in an exemplary embodiment of the invention. The steps of method 700 will be described with reference to communication network 100 in FIG. 1. The steps of the flow chart in FIG. 7 are not all inclusive and may include other steps not shown.

In step 702 of method 700, interface 122 receives call signaling for the call in communication network 100. In step 704, processing system 124 processes the call signaling to identify first network routing information inserted into the call signaling by communication network 100. The first network routing information comprises any information used for routing in communication network 100 or any information derived from the information used for routing. For example, the first network routing information may comprise a point code for a switch, an MSCID for an MSC, a network access identifier for an access point in a wireless network (e.g., a WiFi network), a network domain related to a network location served by a VoIP switch, server, or router, or any other type of information.

In step 706, processing system 124 processes the call signaling to identify caller ID information for the call. In step 708, processing system 124 processes the caller ID information to identify second network routing information associated with the caller ID information. The second network routing information comprises any information included in or derived from the caller ID information that relates to network routing. Processing system 124 may identify the second network routing information in a variety of ways. In one example, processing system 124 may identify a point code in the caller ID information that relates to the calling party directory number. In another example, processing system 124 may identify a network address in the caller ID information, and then identify a network domain for the network address, such as by querying a DNS based on the network address. In the above examples, the second network routing information comprises the point code or the network domain identified from the caller ID information.

In step 710, processing system 124 compares the first network routing information and the second network routing information to determine whether the caller ID information is valid. If the caller ID information is valid, then communication network 100 may transmit the caller ID information to called party 112 through terminating node 104. If the caller ID information is not valid, then communication network 100 may release the call, may transmit the caller ID information and a warning message to called party 112, may transmit a notification to a third party, such as the service provider, law enforcement entities, etc, and/or may determine valid caller ID information and transmit the valid caller ID information to called party 112.

The methods illustrated in FIGS. 3-6 may be incorporated with method 700 to validate caller ID information.

Figure 8:
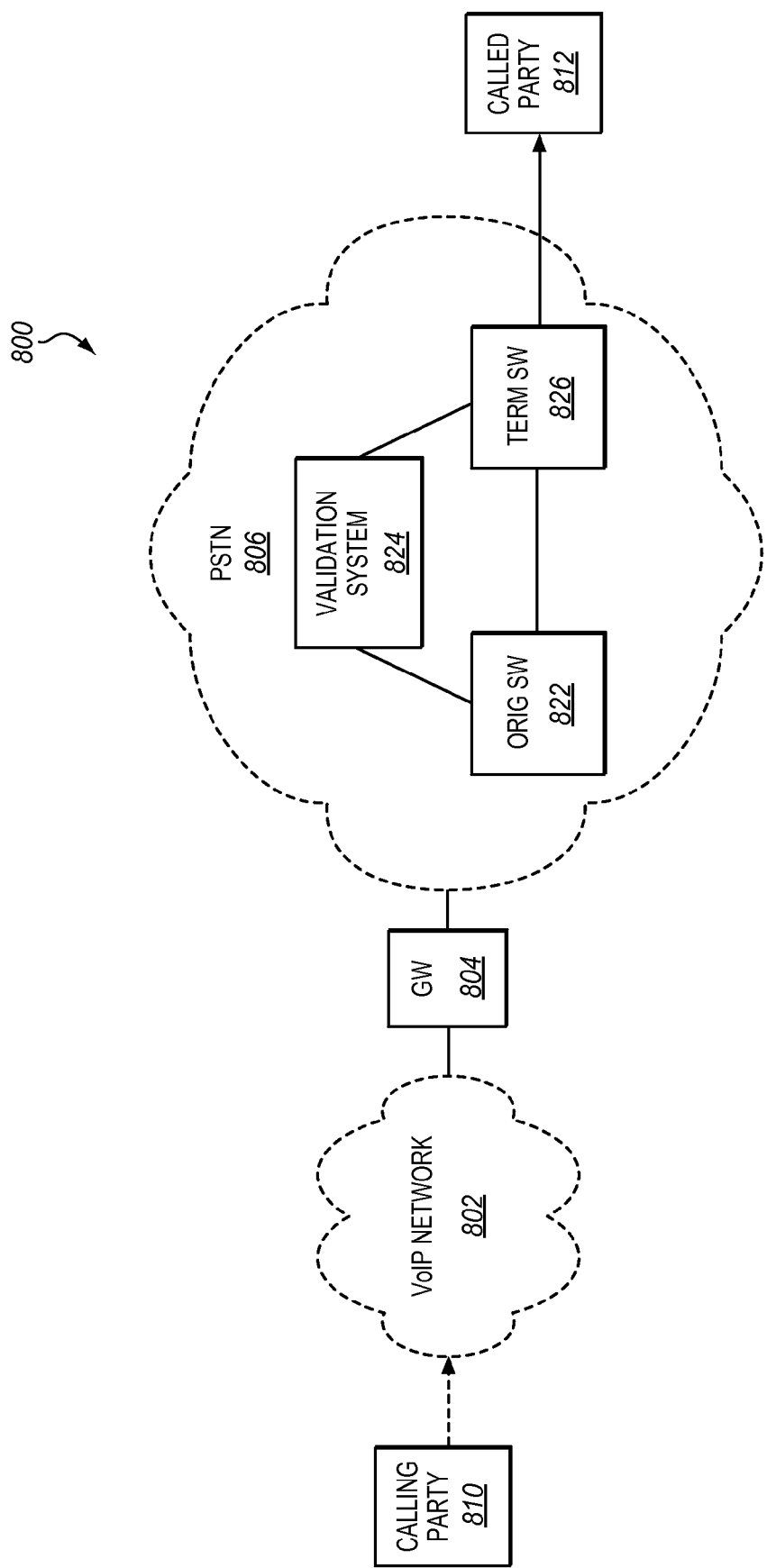
FIGS. 8-9 illustrate examples of communication networks where caller ID validation is performed in exemplary embodiments of the invention.
Figure 9:
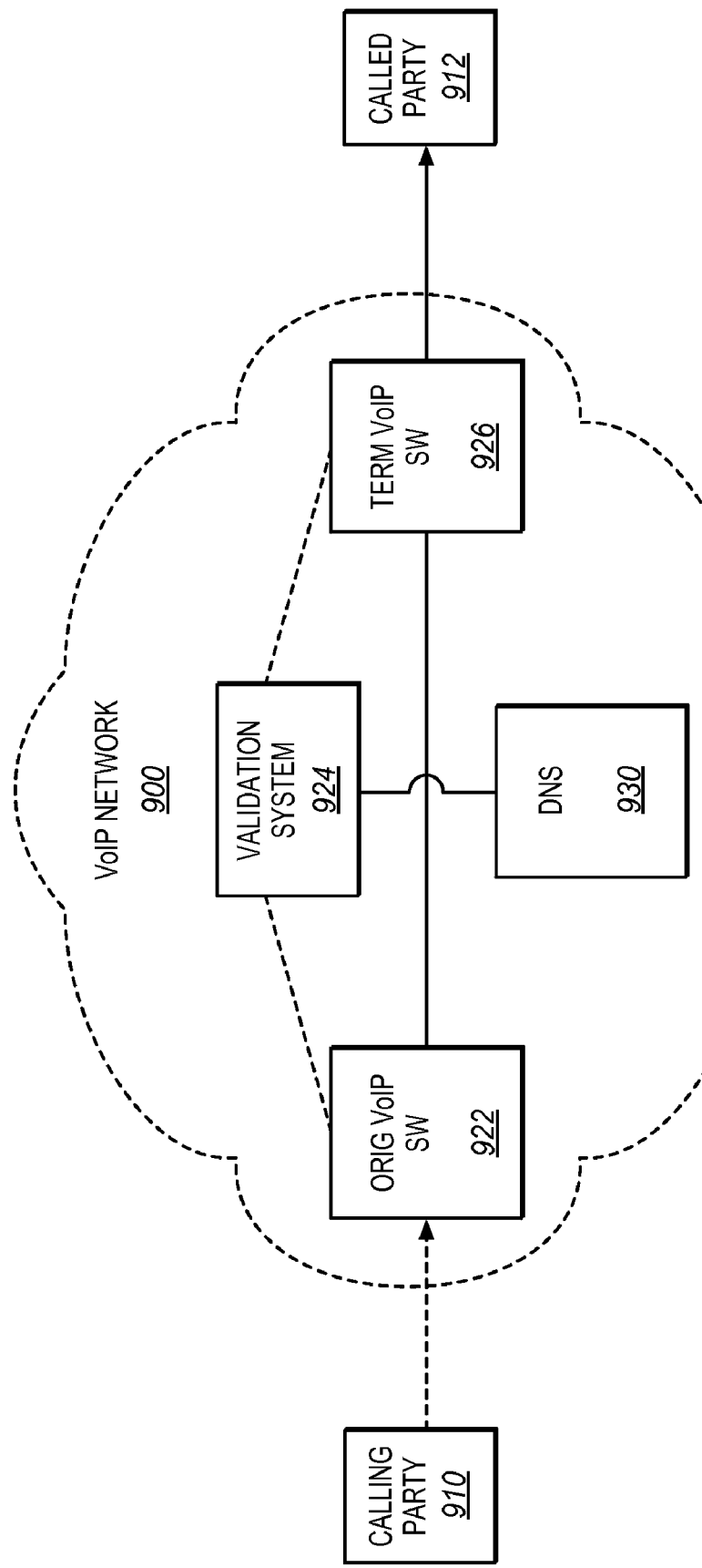

FIGS. 8-9 illustrate examples of communication networks where caller ID validation is performed in exemplary embodiments of the invention. FIG. 8 illustrates a communication network 800 that includes a VoIP network 802, a gateway 804, and a PSTN 806. VoIP network 802 is adapted to serve a calling party 810 that is placing a call to called party 812 being served by PSTN 806. PSTN 806 includes an originating switch 822, a validation system 824, and a terminating switch 826.

When in operation, assume that calling party 810 places the call to called party 812. To place the call, a VoIP device of calling party 810 formats the appropriate SIP message to initiate the call. The SIP message includes caller ID information, such as the directory number for calling party 810, the name for calling party 810, a network domain, etc. The SIP message also includes other call-related information, such as the dialed number, the network address assigned to the VoIP device, and other information. VoIP network 802 receives the SIP message and routes the SIP message to gateway 804 (through IP routers not shown in FIG. 8). Gateway 804 receives the SIP message, and converts the SIP message to an SS7 signaling message used by PSTN 806. In converting the SIP message, gateway 804 maps call-related information and caller ID information in the parameters of the SIP message to parameters of the SS7 signaling message. Gateway 804 then routes the SS7 signaling message to originating switch 822.

Originating switch 822 may perform some call-related functions responsive to receiving the SS7 signaling message. For instance, originating switch 822 inserts its point code into the Signaling Connection Control Part (SCCP) of the SS7 call signaling. SS7 has a protocol stack resembling the OSI protocol stack. One of the lower layers of the SS7 protocol stack is the SCCP layer that stores the point code for originating switch 822.

Originating switch 822 also identifies a calling party directory number in the incoming call signaling, and maps the calling party number parameter into the outgoing signaling message (such as an ISDN User Part (ISUP) message) without changes. The ISUP layer is an upper layer of the SS7 protocol stack that defines messages and protocols used in the establishment and tear-down of calls. Originating switch 822 then sends the call signaling to terminating switch 826.

Responsive to receiving the call signaling at terminating switch 826, validation system 824 processes the SCCP information of the call signaling to identify a point code of originating node 822. Validation system 824 also processes the ISUP information of the call signaling to identify a point code associated with a calling party directory number provided in the caller ID information. Validation system 824 then compares the point code for originating node 822 and the point code associated with the calling party directory number to determine whether the caller ID information is valid. For instance, if the point codes match, then validation system 824 may determine that it is likely that the caller ID information is valid, because the network-entered point code matches the point code associated with the calling party directory number. If the point codes do not match, then validation system 824 may determine that it is not likely that the caller ID information is valid.

FIG. 9 illustrates a VoIP network 900 in an exemplary embodiment of the invention. VoIP network 900 includes an originating VoIP switch 922, a validation system 924, and a terminating VoIP switch 926. VoIP network 900 also includes a Domain Name Server (DNS) 930. Originating VoIP switch 922 is adapted to serve a calling party 910 that is placing a call to called party 912. Terminating VoIP switch 926 is adapted to serve called party 912.

When in operation, assume that calling party 910 places the call to called party 912. To place the call, a VoIP device of calling party 910 formats the appropriate SIP call signaling, such as a SIP INVITE message, to initiate the call. Originating VoIP switch 922 receives the SIP call signaling and forwards the signaling to validation system 924.

Responsive to receiving the SIP call signaling, validation system 924 processes the network address in the SIP call signaling to identify a network domain associated with the network address. For example, validation system 924 may query DNS 930 using the network address in the SIP call signaling for a network domain associated with the network address. DNS 930 stores information mapping network addresses to network domains, and may also store other information related to the network domain, such as a geographic region (city and state) related to the network domain. Responsive to the query, DNS 930 transmits a response to validation system 924 with the network domain information.

Validation system 924 then processes the caller ID information in the SIP call signaling to identify a network domain in the caller ID information. When the VoIP device of the calling party formats the SIP call signaling, such as a SIP INVITE message, one piece of information entered into the call signaling by the VoIP device is a network domain associated with the VoIP device and/or the calling party 910. Validation system 924 thus identifies this network domain in the caller ID information.

Validation system 924 then compares the network domain associated with the network address and the network domain in the caller ID information to determine whether the caller ID information is valid. For instance, if the network domains match, then validation system 924 may determine that it is likely that the caller ID information is valid, because the network domain from DNS 930 matches the network domain in the caller ID information. If the network domains do not match, then validation system 924 may determine that it is not likely that the caller ID information is valid.

Other information may be used from the SIP call signaling to validate the caller ID information. In another embodiment, validation system 924 processes a network address in the SIP call signaling to identify a network domain associated with the network address. Validation system 924 also processes the network domain to identify a geographic region associated with the network domain. For example, validation system 924 may query DNS 930 using the network address in the SIP call signaling for a network domain and an associated geographic region.

Validation system 924 then processes the caller ID information in the SIP call signaling to identify an area code for a calling party directory number in the caller ID information. Validation system 924 processes the area code to identify a geographic region associated with the area code. The North American Numbering Plan (NANP) designates area codes that are related to areas in North America. For instance, the state of Illinois has ten area codes and Texas has seventeen area codes. Validation system 924 can thus identify a geographic region based on the area code of the calling party directory number.

Validation system 924 then compares the geographic region associated with the network domain and the geographic region associated with the area code to determine whether the caller ID information is valid. For instance, if the geographic regions match or are within an acceptable range, then validation system 924 may determine that it is likely that the caller ID information is valid. If the geographic regions do not match or are not within an acceptable range, then validation system 924 may determine that it is not likely that the caller ID information is valid.

In another embodiment, validation system 924 processes a network access identifier in the SIP call signaling. The network access identifier comprises any network address, character string, or other identifier indicating the access point to the VoIP network 900. For example, if VoIP network 900 includes WiFi connectivity, then the network access identifier may comprise a MAC address for the wireless access point providing service to calling party 910. Validation system 924 processes the network access identifier to identify a geographic region associated with the network access identifier. For instance, validation system 924 may query a database (not shown in FIG. 9) that maps network access identifiers to physical addresses (such as a MAC address to a street address).

Validation system 924 then processes the caller ID information in the SIP call signaling to identify a network domain associated with the caller ID information. As stated in a previous example, one piece of information entered into the call signaling by the VoIP device is a network domain associated with the VoIP device and/or the calling party 910. Validation system 924 thus identifies this network domain in the caller ID information.

Validation system 924 then processes the network domain to identify a geographic region associated with the network domain. For example, validation system 924 may query DNS 930 using the network address in the SIP call signaling for a network domain and an associated geographic region.

Validation system 924 then compares the geographic region associated with the network access identifier and the geographic region associated with the network domain to determine whether the caller ID information is valid. For instance, if the geographic regions match or are within an acceptable range, then validation system 924 may determine that it is likely that the caller ID information is valid. If the geographic regions do not match or are not within an acceptable range, then validation system 924 may determine that it is not likely that the caller ID information is valid.

In an IMS specific example, assume that the originating VoIP switch 922 comprises a P-CSCF and the terminating VoIP switch 926 comprises an S-CSCF. When calling party 910 registers with the IMS network, the P-CSCF receives a SIP REGISTER message and inserts a network access identifier in the REGISTER message. The P-CSCF then forwards the REGISTER message to the S-CSCF which stores information on calling party 910 in a Home Subscriber Server (HSS). As part of storing the information, the S-CSCF stores the network access identifier in the HSS. Assume subsequently that calling party 910 initiates a call over the IMS network. The P-CSCF receives call signaling (SIP INVITE message) and inserts a network access identifier into the INVITE message. The P-CSCF then routes the INVITE message to validation system 924. Validation system 924 processes the INVITE message to identify the network access identifier in the INVITE message. Validation system 924 also queries the HSS to identify the network access identifier that was included in the REGISTER message. Validation system 924 then compares the network access identifiers, and if they match, then validation system 924 may determine that it is likely that the caller ID information is valid. If the network access identifiers do not match, then validation system 924 may determine that it is not likely that the caller ID information is valid.

Although specific embodiments were described herein, the scope of the invention is not limited to those specific embodiments. The scope of the invention is defined by the following claims and any equivalents thereof.

I claim:

1. A validation system adapted to validate caller ID information in a communication network, the validation system comprising:

an interface system adapted to receive call signaling for a call in the communication network; and a processing system adapted to:
- process the call signaling to identify originating node information inserted in the call signaling by an originating node in the communication network, the originating node information comprising a network address for the originating node;
- process the call signaling to identify caller ID information for the call;
- process the originating node information and the caller ID information to determine whether the call originated from the originating node by:
  - processing the network address to identify a network domain associated with the network address;
  - processing the caller ID information to identify a network domain in the caller ID information; and
  - comparing the network domain associated with the network address and the network domain in the caller ID information to determine whether the call originated from the originating node;
- determine that the caller ID information is valid responsive to determining that the call originated from the originating node; and
- determine that the caller ID information is counterfeit responsive to determining that the call did not originate from the originating node.

2. The validation system of claim 1 wherein the originating node information further comprises a point code for the originating node and wherein the processing system is further adapted to:
- process the caller ID information to identify a point code associated with the caller ID information; and
- compare the point code for the originating node and the point code associated with the caller ID information to determine whether the call originated from the originating node.

3. The validation system of claim 1 wherein the processing system is further adapted to:
- process the network domain associated with the network address to identify a geographic region associated with the network domain;
- process the caller ID information to identify an area code for a calling party directory number in the caller ID information;
- process the area code to identify a geographic region associated with the area code; and
- compare the geographic region associated with the network domain associated with the network address and the geographic region associated with the area code to determine whether the call originated from the originating node.

4. The validation system of claim 1 wherein the originating node information further comprises a network access identifier for the originating node and wherein the processing system is further adapted to:
- process the network access identifier to identify a geographic region associated with the network access identifier;
- process the network domain in the caller ID information to identify a geographic region associated with the network domain; and
- compare the geographic region associated with the network access identifier and the geographic region associated with the network domain in the caller ID information to determine whether the call originated from the originating node.

5. A method of validating caller ID information in a communication network, the method comprising:
- receiving call signaling for a call in the communication network;
- processing the call signaling to identify originating node information inserted into the call signaling by an originating node in the communication network, the originating node information comprising a network address for the originating node;
- processing the call signaling to identify caller ID information for the call;
- processing the originating node information and the caller ID information to determine whether the call originated from the originating node by:
  - processing the network address to identify a network domain associated with the network address;
  - processing the caller ID information to identify a network domain in the caller ID information; and
  - comparing the network domain associated with the network address and the network domain in the caller ID information to determine whether the call originated from the originating node;
- determining that the caller ID information is valid responsive to determining that the call originated from the originating node; and
- determining that the caller ID information is counterfeit responsive to determining that the call did not originate from the originating node.

6. The method of claim 5 wherein the originating node information further comprises a point code for the originating node and wherein the step of processing the originating node information and the caller ID information comprises:
- processing the caller ID information to identify a point code associated with the caller ID information; and
- comparing the point code for the originating node and the point code associated with the caller ID information to determine whether the call originated from the originating node.

7. The method of claim 5 wherein the step of processing the originating node information and the caller ID information further comprises:
- processing the network domain associated with the network address to identify a geographic region associated with the network domain;
- processing the caller ID information to identify an area code for a calling party directory number in the caller ID information;
- processing the area code to identify a geographic region associated with the area code; and
- comparing the geographic region associated with the network domain associated with the network address and the geographic region associated with the area code to determine whether the call originated from the originating node.

8. The method of claim 5 wherein the originating node information further comprises a network access identifier for the originating node and wherein the step of processing the originating node information and the caller ID information further comprises:
- processing the network access identifier to identify a geographic region associated with the network access identifier;
- processing the network domain to identify a geographic region associated with the network domain in the caller ID information; and
- comparing the geographic region associated with the network access identifier and the geographic region associated with the network domain in the caller ID information to determine whether the call originated from the originating node.

9. The method of claim 5 further comprising:
transmitting the caller ID information to a called party responsive to a determination that the caller ID information is valid; and
releasing the call responsive to a determination that the caller ID information is counterfeit.

10. The method of claim 5 further comprising:
transmitting the caller ID information to a called party responsive to a determination that the caller ID information is valid; and
transmitting the caller ID information and a warning message to a called party responsive to a determination that the caller ID information is counterfeit.

11. The method of claim 5 further comprising:
transmitting a notification to a third party responsive to a determination that the caller ID information is counterfeit.

12. The method of claim 5 further comprising:
determining valid caller ID information responsive to a determination that the caller ID information is counterfeit; and
transmitting the valid caller ID information to a called party.

13. A method of validating caller ID information in a communication network, the method comprising:
receiving call signaling for a call in the communication network, the call signaling comprising SIP signaling;
processing the call signaling to identify first network routing information inserted into the call signaling by an originating node in the communication network by processing the SIP signaling to identify a network address in the SIP signaling, and to identify a network domain associated with the network address;
processing the call signaling to identify caller ID information for the call;
processing the caller ID information to identify second network routing information associated with the caller ID information by processing the caller ID information in the SIP signaling to identify a network domain provided in the SIP signaling; and
comparing the first network routing information and the second network routing information to determine whether the caller ID information is valid by comparing the network domain associated with the network address and the network domain provided in the SIP signaling.

14. The method of claim 13:
wherein the call signaling further comprises SS7 signaling;
wherein processing the call signaling to identify first network routing information further comprises processing a signaling connection control part (SCCP) of the SS7 signaling to identify a point code of an originating node for the call;
wherein processing the caller ID information to identify second network routing information further comprises processing an ISDN user part (ISUP) of the SS7 signaling to identify a point code associated with a caller ID number provided in the caller ID information; and
wherein comparing the first network routing information and the second network routing information further comprises comparing the point code for the originating node and the point code associated with the caller ID number to determine whether the caller ID information is valid.

15. The method of claim 13:
wherein processing the call signaling to identify first network routing information further comprises processing the SIP signaling to identify a geographic region associated with the network domain;
wherein processing the caller ID information to identify second network routing information further comprises processing the SIP signaling to identify an area code for a calling party directory number in the caller ID information, and to process the area code to identify a geographic region associated with the area code; and
wherein comparing the first network routing information and the second network routing information further comprises comparing the geographic region associated with the network address and the geographic region associated with the area code to determine whether the caller ID information is valid.

16. The method of claim 13:
wherein processing the call signaling to identify first network routing information further comprises processing the SIP signaling to identify a network access identifier in the SIP signaling, and to identify a geographic region associated with the network access identifier;
wherein processing the caller ID information to identify second network routing information further comprises identifying a geographic region associated with the network domain provided in the SIP signaling; and
wherein comparing the first network routing information and the second network routing information further comprises comparing the geographic region associated with the network access identifier and the geographic region associated with the network domain provided in the SIP signaling to determine whether the caller ID information is valid.

* * * * *